United States Patent
Huang et al.

(10) Patent No.: US 6,772,522 B1
(45) Date of Patent: Aug. 10, 2004

(54) QUICK DISASSEMBLY HACKSAW

(76) Inventors: Yin-Hae Huang, P.O. Box 697, Feng-Yuan City, Taichung Hsien (TW), 420; Hsin-Hung Li, P.O. Box 697, Feng-Yuan City, Taichung Hsien (TW), 420

( * ) Notice: Subject to any disclaimer, the term of this patent is extended or adjusted under 35 U.S.C. 154(b) by 0 days.

(21) Appl. No.: 10/635,547

(22) Filed: Aug. 7, 2003

(51) Int. Cl.[7] .............................................. B27B 21/06
(52) U.S. Cl. .............................. 30/513; 30/517; 30/519
(58) Field of Search ........................... 30/513, 517, 507, 30/519, 509, 512

(56) References Cited

U.S. PATENT DOCUMENTS

| | | | | |
|---|---|---|---|---|
| 3,822,731 A | * | 7/1974 | Keymer | 30/513 |
| 4,079,763 A | * | 3/1978 | Riley | 30/508 |
| 4,571,892 A | * | 2/1986 | Brill | 125/11.23 |
| 5,388,333 A | * | 2/1995 | Chen | 30/508 |
| 6,457,244 B1 | * | 10/2002 | Huang | 30/513 |

* cited by examiner

Primary Examiner—Douglas D Watts

(57) ABSTRACT

A quick disassembly hacksaw includes an inverse U-shaped frame having a flexible triangular front handle on fore end, a rear handle on rear end, a front tube and a rear tube respectively disposed under the fore end and rear end, an adjusting mechanism disposed in the front tube, a positioning rod inserted into the rear tube each of which has a polyhedron for connecting a saw blade and a fastening mechanism comprised of a link and a U-shaped leverage latch pivoted to the positioning rod and a lug under the rear handle and locked by a safety detent on a top of the rear handle. The saw blade is fastened by the fastening mechanism and the tensions thereof is adjusted by the adjusting mechanism.

3 Claims, 6 Drawing Sheets

QUICK DISASSEMBLY HACKSAW

BACKGROUND OF THE INVENTION

The present invention relates to carpentry tools and more particularly to a quick disassembly hacksaw.

A prior art hacksaw 10 (as shown in FIG. 1) comprises generally a frame 11, a handle 12 on rear end of the frame 11 and a saw blade 13 which has a pair of thru holes 131 and 132 respectively formed adjacent two ends thereof. The thru hole 131 engages on a lateral pin 141 of a threaded shank 14 in a graduated tube 17 under the front end of the frame 11 and is fastened with a wing nut 15. The thru hole 132 engages on a lateral pin 161 of a projection 16 on the bottom of the handle 12. The blade 13 is being tensed and/or loosened up by rotation of the wing nut 15. The graduated tube 17 facilitates the blade 13 to turn a certain angle relative to the frame 11. However, it has the disadvantages that the wing nut 15 may be loosened up under the shake of operation and the frame is of solid structure and not flexible, so that this type of hacksaw 10 could not serve for different lengths of the blades 13.

My previous invention entitled STRUCTURE OF A HACKSAW (U.S. U.S. Pat. No. 6,457,244 B1, Issued on Oct. 1, 2002) has improved the above discussed disadvantages. After repeated tests and application, it proves that this type of hacksaw achieves its expected result. Nevertheless, it has still the spaces of improvement to be done in order to intensify the blade cutting strength, to simplify the manufacturing process and to speed up the quick assembly and/or disassembly of the blade.

SUMMARY OF THE PRESENT INVENTION

The present invention has a main object to provide a quick disassembly hacksaw which has a simplified manufacturing process, intensified blade, quick assembly and/or disassembly structure in order to achieve an expected operational result.

Another object of the present invention is to provide a quick disassembly hacksaw which has an adjusting mechanism providing a buffer space to prevent the blade from becoming bent and/or deformed to bring about elasticity due to the loose of a fastening mechanism during disassembly of the blade.

Accordingly, the quick disassembly hacksaw of the present invention comprises generally a frame, a front handle, a rear handle, an adjusting mechanism at front end of the frame and a fastening mechanism at the rear end of the frame. Each of the mechanisms respectively connects a threaded shank and pivoted with a positioning rod. A saw blade has a thru hole in each end engaged with a projection on a polyhedron on inner end of the threaded shank and the positioning rod. The adjusting mechanism is provided to adjust the tensions of the blade and the fastening mechanism is provided to the blade. When the fastening mechanism is released. The blade together with the adjusting mechanism move forward to avoid the blade to be bent and/or deformed to create elasticity in order to smoothly disassembly the blade from the frame.

The present invention will become more fully understood by reference to the following detailed description thereof when read in conjunction with the attached drawings.

DETAILED DESCRIPTION OF THE PREFERRED EMBODIMENT

Figure 1:
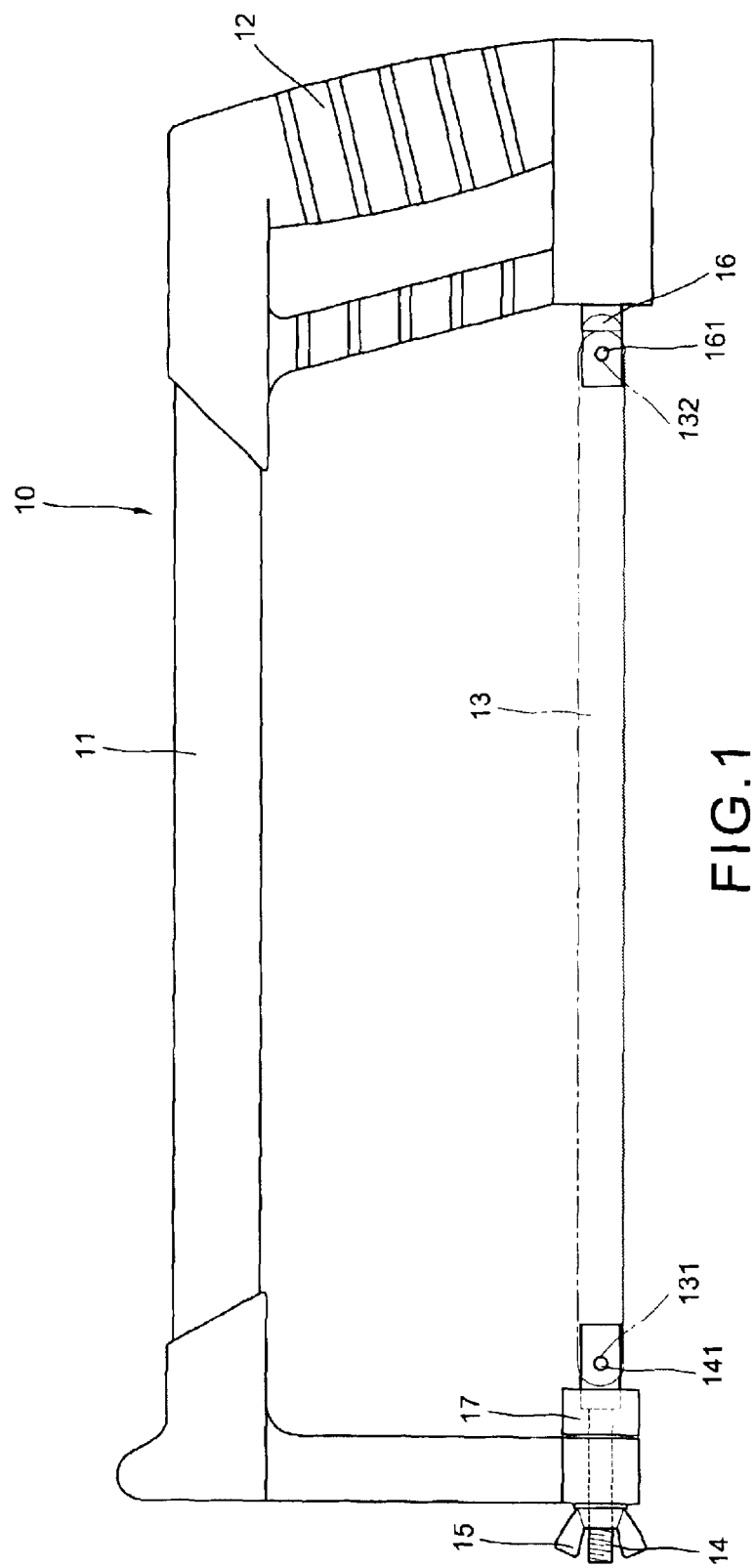
FIG. 1 is a plane view of a prior art hacksaw.
Figure 2:
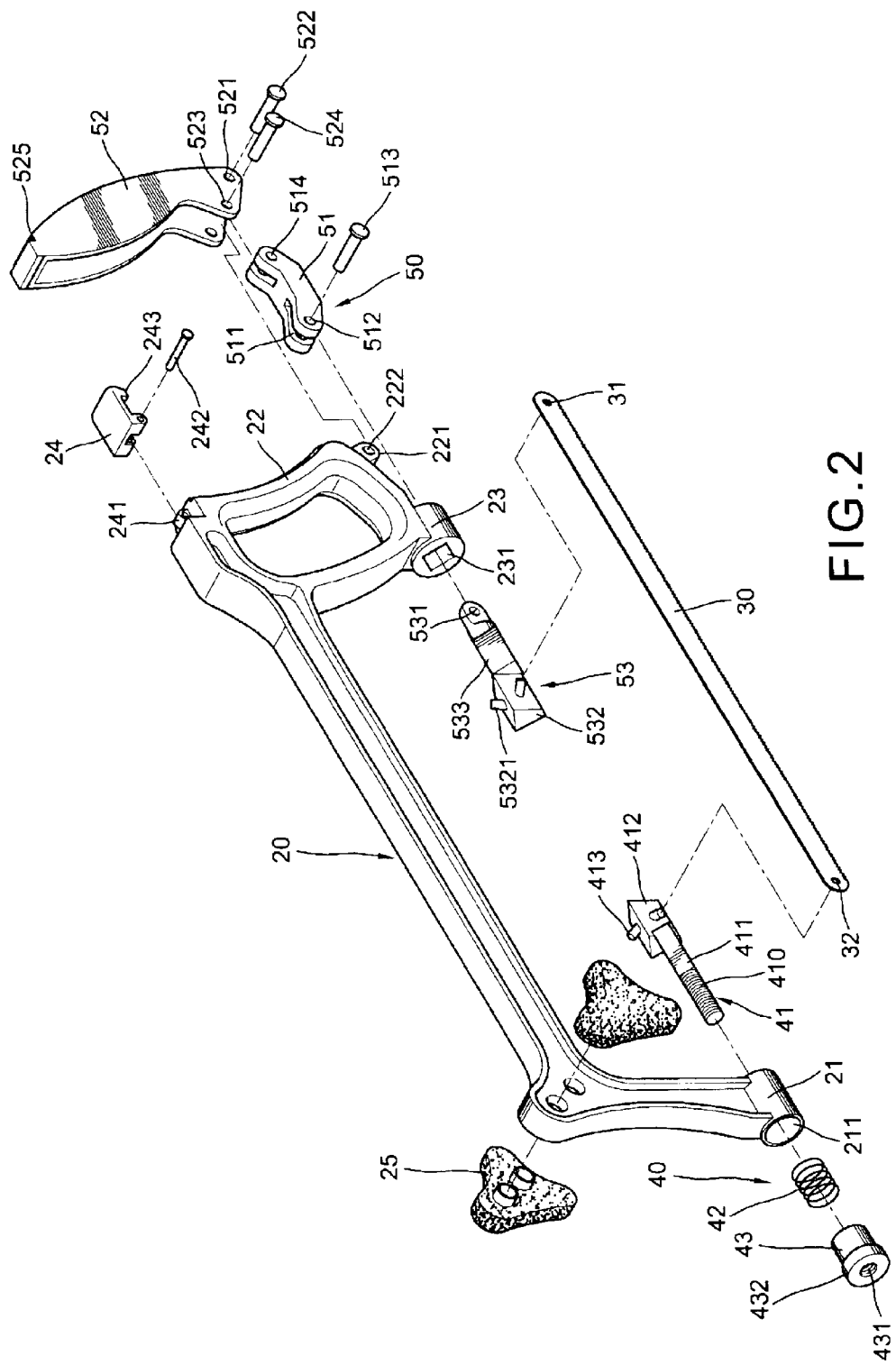
FIG. 2 is an exploded perspective view to show a hacksaw of the preferred embodiment of the present invention.

With reference to the drawings and initiated from FIGS. 1 and 2, the quick disassembly hacksaw of the present invention comprises an inverse U-shaped frame 20 including a front tube 21 under fore end which has a circular inner wall 211 in fore end and a rectangular inner wall 212 in rear end (as shown FIG. 6), a rear handle 22, a flexible triangular front handle 25, a rear tube 23 under the rear handle which has a rectangular inner wall 231, a lug 221 under the rear handle apart from the rear tube 23 and having a lateral thru hole 222, a pivotal tube 241 on an indented top of the rear handle 22 and a safety detent 24 pivoted on the pivotal tube 241 by a rivet 242. The safety detent 24 has a hook 243 under outer end.

Figure 4:
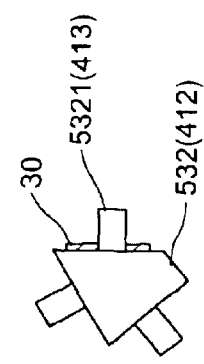
FIG. 4 is a plane view to show a polyhedron on the threaded shank and the positioning rod.

An adjusting mechanism 40 has a shank 41 which includes a threaded cylindrical fore part 410, a rectangular rear part 411 inserted into the front tube 21, a polyhedron 412 connected to the free end of the rectangular rear part 411 and a slant projection 413 on each lateral surfaces of the polyhedron 412 (as shown in FIG. 4), a spring 42 sleeved on the shank 41 and a tubular adjustable button 43 screwed on the threaded cylindrical fore part 410 of the shank 41 and biased by the spring 42. The tubular adjustable button 43 which is provided to conduct a minute adjustment of the tensions for the saw blade 30 has a threaded central bore in an enlarged annular flange and engageable threaded cylindrical fore part 410 of the shank 41.

A positioning rod has a horizontal hole 531 in an outer end, a rectangular body 533 inserted into the rear tube 23 and a polyhedron 532 on inner end and a slant projection 5321 on each of its lateral surfaces. The polyhedron 53 is formed similar at the polyhedron 412 but they are symmetrically arranged.

Figure 6:
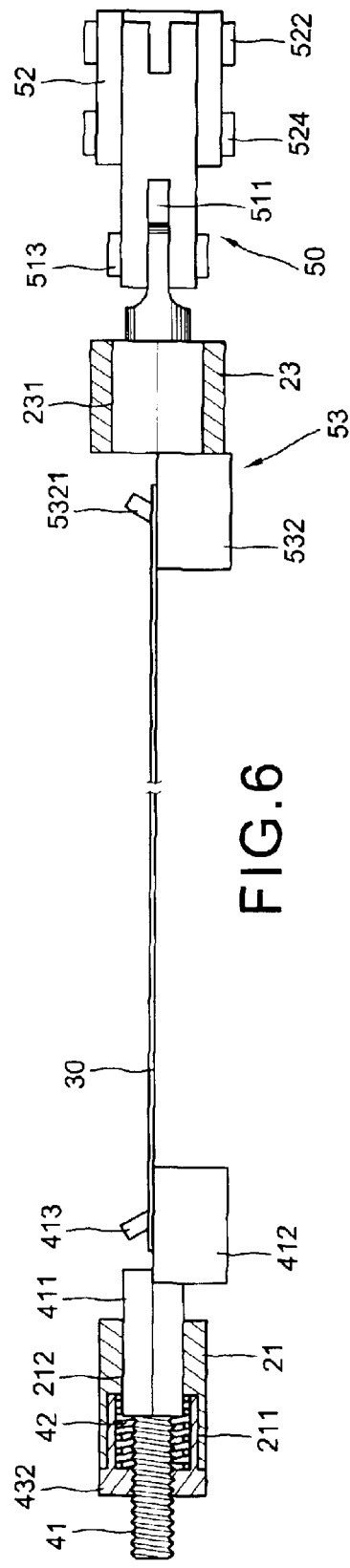
FIG. 6 is a top sectional view of the hacksaw of the present invention.

A fastening mechanism 50 is comprised of a link 51 and a leverage latch 52. The link 51 has a pair of central slits 511, a first aligned thru hole 511 in fore end engaged with the horizontal hole 531 of the positioning rod 53 and rotatably secured by a rivet 513 and a second aligned thru hole 514 in rear end. The leverage latch 52 has a roughly U-shaped body, a third aligned thru hole 521 in a lower end engaged with the second aligned thru hole 514 of the link 51 and rotatably secured by a rivet 522, a fourth aligned thru hole 523 in a lower end apart from the third aligned thru hole 521 engaged with the horizontal hole 222 of the lug 221 and rotatably secured by a rivet 524 and a fixed groove 525 in an outer top engageable with the hook 243 of the safety detent 24 (as shown in FIG. 6).

The saw blade 30 has a thru hole 31 and 32 adjacent each end respectively and selectively engaged on one slant projection 413 and 5321 of each of the polyhedrons 412 and 532.

Figure 3:
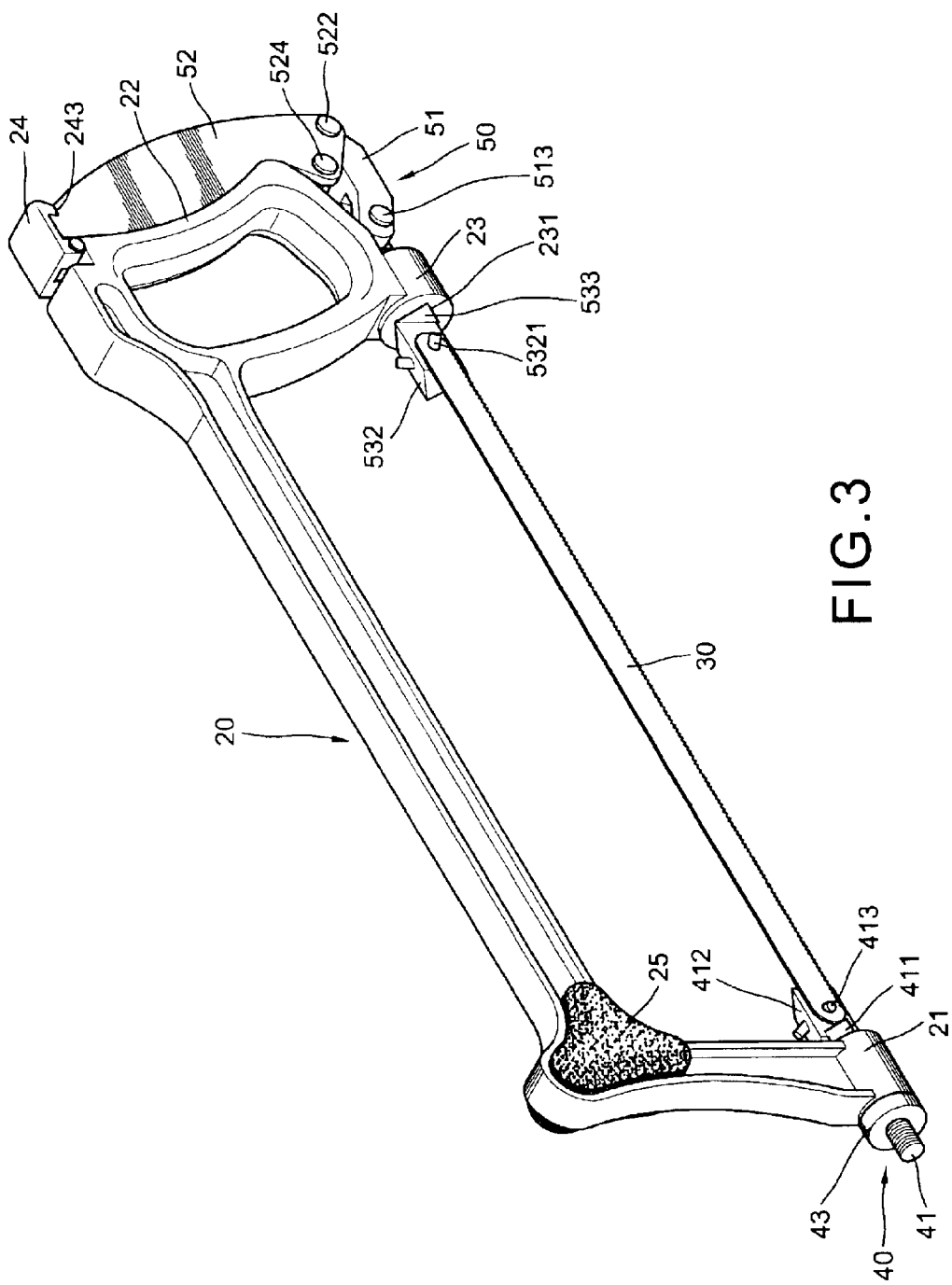
FIG. 3 is a perspective view to show the assembly of FIG. 2.
Figure 5:
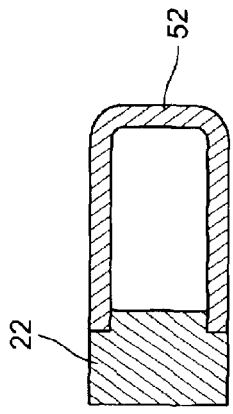
FIG. 5 is a sectional view to show a leverage latch leaned on the rear handle.
Figure 7:
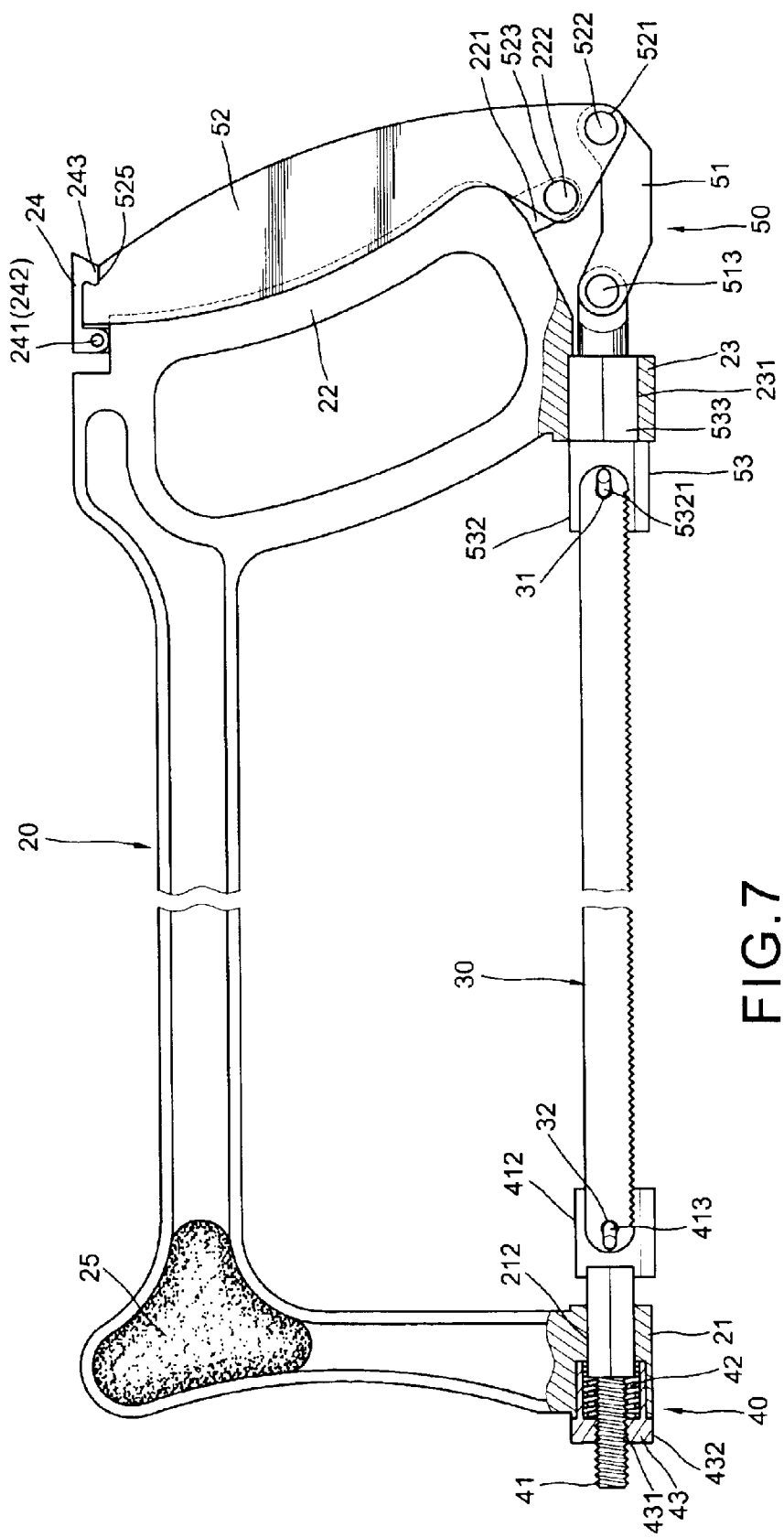
FIG. 7 is a side view of the hacksaw of the present invention.

When assembling the saw blade 30, first decide the tilting angle for the blade 30, then engage the thru holes 31 and 32 respectively to a pair of selected slant projections 413 and 5321 and then press the U-shaped leverage latch 52 of the fastening mechanism inward to close the rear handle 22 which is locked by the hook 243 of the safety detent 24, finally turn about the adjustable button 43 to conduct a minute adjustment of the tensions for the saw blade 30. The hacksaw is therefore applicable (as shown in FIGS. 3, 5 and 7).

Figure 8:
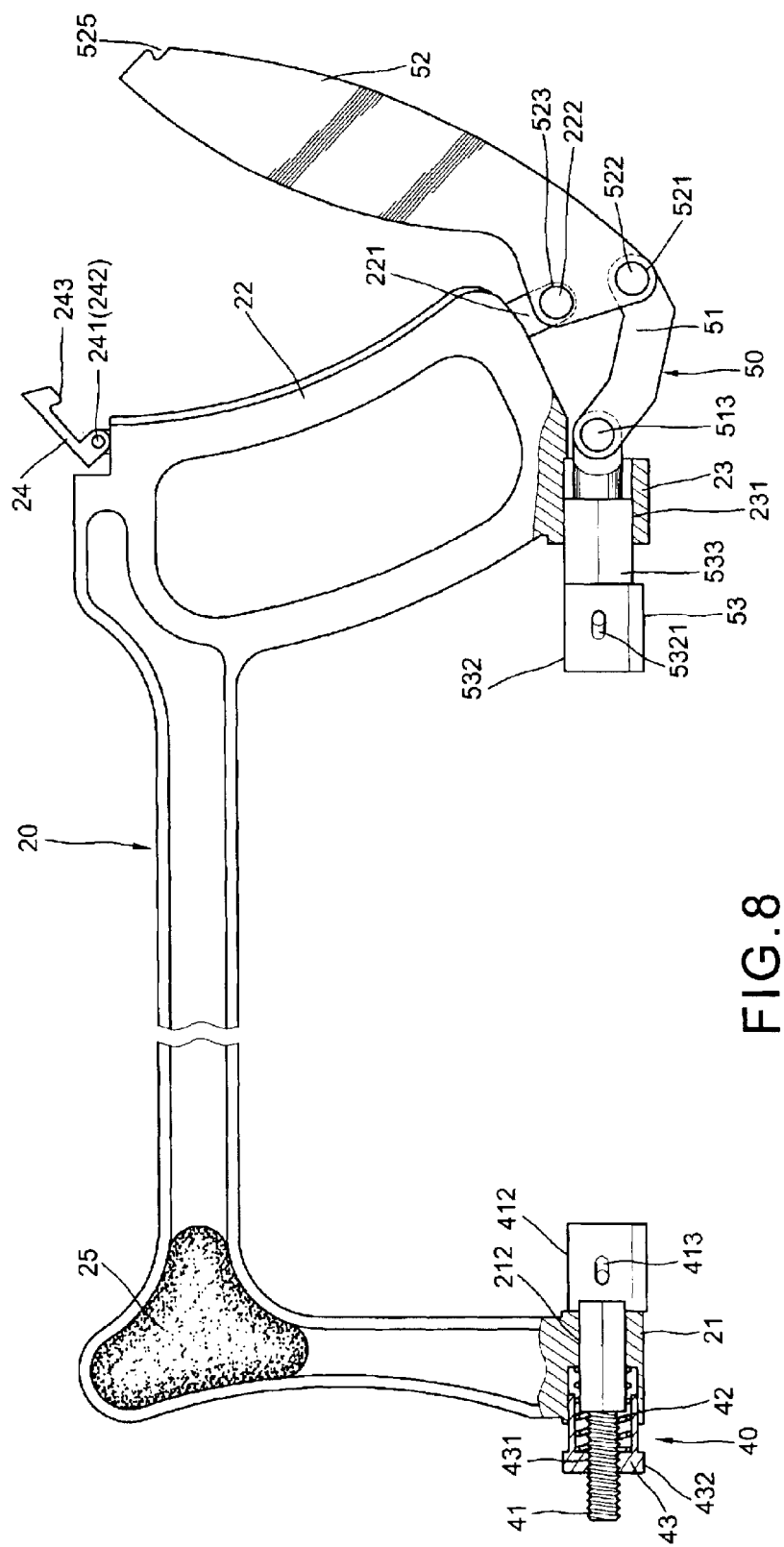
FIG. 8 is a side view to show that the blade is smoothly removed from the frame.

When disassembling the saw blade 30, lift the safety detent 24 up, the U-shaped leverage latch 52 under the resilience of the spring 42 automatically rotates outward on the lug 221. The link 51 together with the positioning rod 53 are pushed by the leverage latch 52 to move forward providing a buffer space which avoids the blade 30 to be bent and/or deformed in order to facilitate a smooth removement of the blade 30 from the slant projections 413 and 5321 without adjusting the shank 41 of the adjusting mechanism 40 (as shown in FIG. 8).

Based on the above discussed arrangement, the hacksaw of the present invention not only solves the problems of the above prior art but also provides the quick assembly and disassembly functions. Further, the adjusting mechanism 40 not only adjusts the tensions for the blade 30 but also prevents the blade 30 from loosened. And the slant projections 413 and 5321 arranged on different surfaces of the polyhedrons 412 and 532 facilitates the blade 30 to turn different angles to cut different working pieces from different directions.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

We claim:

1. A quick disassembly hacksaw comprising:

an inverse U-shaped frame having a fore end, a rear end, a flexible triangular handle on a top of said fore end, a rear handle on said rear end, a front tube under said fore end including a circular inner wall in fore end and a rectangular inner wall in rear end thereof, a rear tube under said rear handle including a rectangular inner wall therein, a lug including a first horizontal hole disposed under said rear handle positioned apart from said rear tube, an indented corner on top of said rear handle, a pivotal tube on said indented corner and a safety detent having an inner end pivoted on said pivotal tube by a rivet and a hook under outer end thereof;

an adjusting mechanism having a shank which has a threaded cylindrical fore part and a rectangular rear part inserted into said front tube including a first polyhedron on free end of said rectangular rear part which has a first slant projection on each lateral surface thereof and a tubular adjustable button screwed on said threaded cylindrical fore part and biased by a spring means therebetween, said tubular button having an enlarged annular flange at outer end including a threaded central bore therein engaged with said threaded cylindrical fore part;

a positioning rod having a rectangular body inserted into said rear tube, a second horizontal hole in an outer end and a second polyhedron on an inner end including a slant projection on each lateral surface, said second polyhedron being arranged symmetrical with said first polyhedron;

a fastening mechanism comprised of a link and a U-shaped leverage latch, said link having a pair of central slits, a first aligned thru hole adjacent an inner end engaged said second horizontal hole of said positioning rod and rotatably secured by a rivet and a second aligned thru hole adjacent an outer end thereof, said U-shaped leverage latch having third aligned thru hole adjacent a lower end engaged with said second aligned thru hole of said link and rotatably secured by a rivet, a fourth aligned thru hole adjacent a lower end apart from said third aligned thru hole engaged with said first horizontal hole of said lug and rotatably secured by a rivet and a fixed groove in a top thereof engageable with said hook of said safety detent;

a saw blade having a thru hole adjacent each end engageable with said slant projections of said first and second polyhedrons respectively.

2. The hacksaw as recited in claim 1 wherein said fastening mechanism is functioned to lock said saw bladed.

3. The hacksaw as recited in claim 1 wherein said adjusting mechanism is functioned to conduct a minute adjustment of tension for said saw blade.

* * * * *